Patented May 16, 1933

1,909,365

UNITED STATES PATENT OFFICE

ALBERT KNABNER, OF BERLIN, GERMANY, ASSIGNOR TO TELEFUNKEN GESELLSCHAFT FÜR DRAHTLOSE TELEGRAPHIE M. B. H. HALLESCHES, OF BERLIN, GERMANY, A CORPORATION OF GERMANY

METHOD OF MAKING FLUORESCENT SCREENS

No Drawing. Application filed February 11, 1930, Serial No. 427,661, and in Germany March 22, 1929.

The present invention is concerned with a method of manufacturing fluorescent screens for cathode-ray or similar tubes. Fluorescent screens are usually made as follows:—

The fluorescent substances in pulverulent condition are digested or stirred with a liquid such as water, alcohol, waterglass, or the like, acting as a binder or cement, and are then brought upon a suitable backing such as the inner wall of a vacuum vessel or a mica disc by simply spreading or by spraying the material to form a coating on the base.

Where these methods are used it is often noted that the pulverulent fluorescent substances adhere very bady or that at evacuating temperature of 360 degrees inorganic binders such as waterglass or organic binders, such as lacquer, etc., are affected so that the fluorescent substances upon the slightest percussion are caused to detach or fall off from the glass wall or the mica lamina. Now, it has been found that the screens will be greatly improved as regards uniformity, durability, and sensitiveness to shock, heat, etc., if halogen compounds or mixtures of some suitable sort are added to the fluorescent substances. A solution of iodine in alcohol has proved particularly suitable therefor. Durable and smooth screens can also be obtained by adding calcium bromide or calcium iodide to the fluorescent calcium tungstate compounds of which the screen mainly is composed.

What I claim is:

1. In an electric discharge device, a fluorescent screen comprising a mixture composed predominantly of a powdered fluorescent material and containing an inorganic binder and a halogen.

2. In an electric discharge device, a fluorescent screen composed predominantly of a powdered fluorescent material and containing an inorganic binder and a halogen salt of an alkaline earth metal.

3. In an electric discharge device, a fluorescent screen consisting of a fluorescent compound of an alkaline earth metal, an inorganic binder, and a halogen salt of the alkaline earth metal of said compound.

4. In an electric discharge device, a fluorescent screen consisting of a coating which is predominantly calcium tungstate, and which contains an inorganic binder and a halogen salt of calcium.

5. In an electric discharge device, a fluorescent screen consisting of a coating which is predominantly calcium tungstate, and which contains an inorganic binder and calcium iodide.

ALBERT KNABNER.